(12) United States Patent
Khan et al.

(10) Patent No.: US 8,487,626 B2
(45) Date of Patent: Jul. 16, 2013

(54) DOWNHOLE SENSOR ASSEMBLY AND METHOD OF USING SAME

(75) Inventors: Alamzeb Hafeez Khan, Montgomery, TX (US); Brett Herbert Stanes, Spring, TX (US); Kevin William Clark, Montgomery, TX (US); Gregory Edward Leuenberger, Montgomery, TX (US)

(73) Assignee: National Oilwell DHT, LP, Houston, TX (US)

( * ) Notice: Subject to any disclaimer, the term of this patent is extended or adjusted under 35 U.S.C. 154(b) by 209 days.

(21) Appl. No.: 13/225,284

(22) Filed: Sep. 2, 2011

(65) Prior Publication Data

US 2012/0062235 A1   Mar. 15, 2012

Related U.S. Application Data

(60) Provisional application No. 61/382,817, filed on Sep. 14, 2010.

(51) Int. Cl.
*G01V 3/00*   (2006.01)

(52) U.S. Cl.
USPC ........................................................ 324/346

(58) Field of Classification Search
USPC ........................................................ 324/346
See application file for complete search history.

(56) References Cited

U.S. PATENT DOCUMENTS

| | | | |
|---|---|---|---|
| 4,013,945 A | 3/1977 | Grosso | |
| 4,479,564 A | 10/1984 | Tanguy | |
| 4,739,262 A | 4/1988 | Fleetwood | |
| 4,845,434 A | 7/1989 | Kuckes | |
| 4,903,245 A | 2/1990 | Close | |
| 5,226,332 A | 7/1993 | Wassell | |
| 5,448,227 A | 9/1995 | Orban | |
| 5,467,083 A | 11/1995 | McDonald | |
| 5,646,611 A | 7/1997 | Dailey | |
| 6,227,044 B1 | 5/2001 | Jarvis | |
| 6,529,834 B1 | 3/2003 | Estes | |
| 6,712,159 B2 | 3/2004 | Estes | |
| 6,842,699 B2 | 1/2005 | Estes | |
| 6,966,211 B2 | 11/2005 | Wu | |
| 7,082,821 B2 | 8/2006 | Chen | |
| 7,114,565 B2 | 10/2006 | Estes et al. | |
| 7,168,506 B2 * | 1/2007 | Boucher et al. | 175/48 |

(Continued)

OTHER PUBLICATIONS

International Search Report for PCT Application No. PCT/US2011/050432 dated Mar. 22, 2012, pp. 1-4.

*Primary Examiner* — Reena Aurora
(74) *Attorney, Agent, or Firm* — The JL Salazar Law Firm

(57) ABSTRACT

A sensor assembly for sensing downhole parameters is provided. The sensor assembly is positionable in a downhole tool deployable into a subterranean formation to form a wellbore. The sensor assembly includes a carrier positionable in the downhole tool, at least one set of three accelerometers, and at least one set of three magnetometers. The carrier includes at least one set of three receptacles. The three receptacles are positioned radially about a periphery of the carrier at equal distances thereabout. The set of three accelerometers are correspondingly positionable in the at least one set of three receptacles, and the set of three magnetometers are correspondingly positionable in the at least one set of three receptacles. The set of three magnetometers includes two physical magnetometers and one virtual magnetometer. The virtual magnetometer is produced from the two physical magnetometers.

27 Claims, 16 Drawing Sheets

U.S. PATENT DOCUMENTS

| | | |
|---|---|---|
| 7,252,144 B2 | 8/2007 | Estes |
| 7,363,717 B2 | 4/2008 | Ekseth |
| 7,798,246 B2 | 9/2010 | Collins |
| 2007/0203651 A1 | 8/2007 | Blanz |
| 2010/0026291 A1 | 2/2010 | Schmid |
| 2010/0108386 A1 | 5/2010 | Martinez et al. |

* cited by examiner

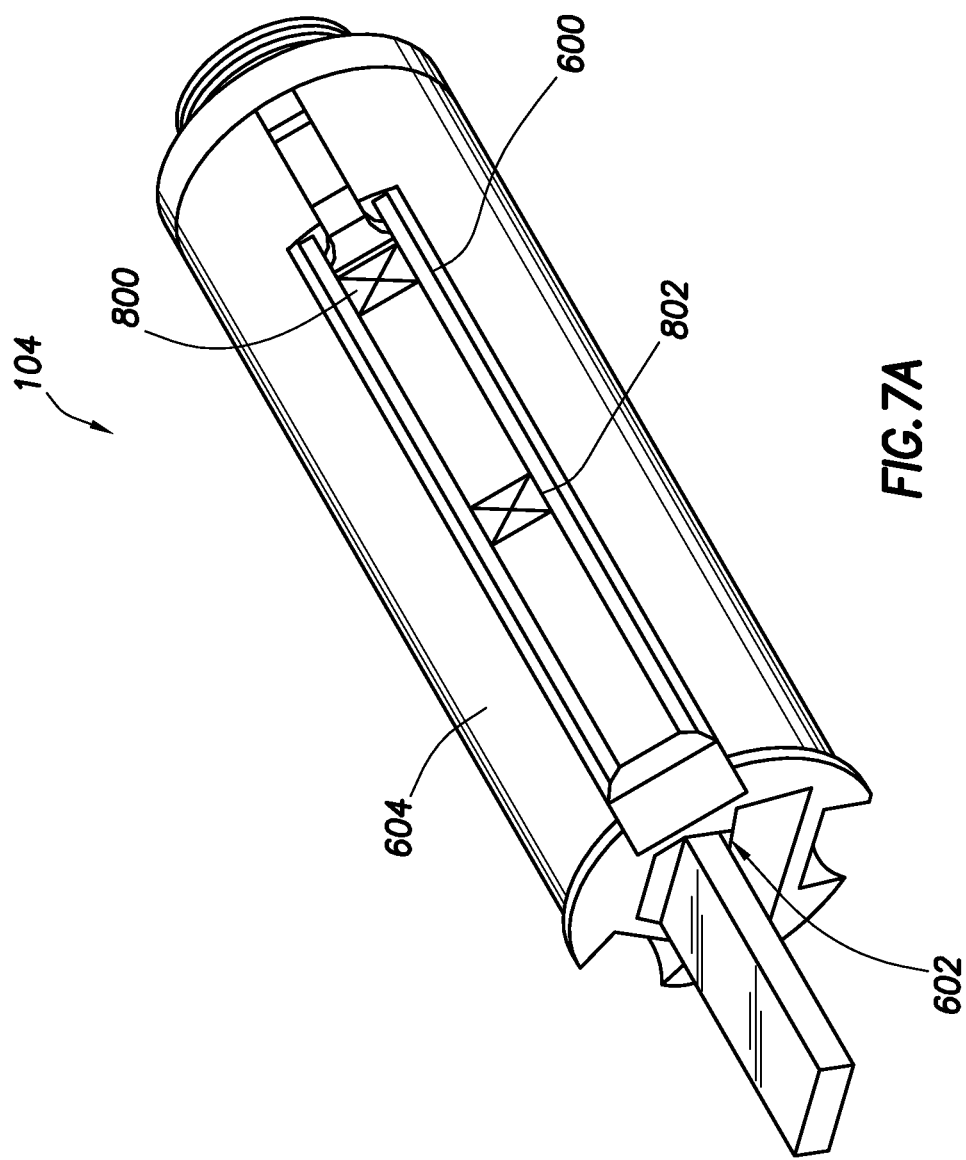

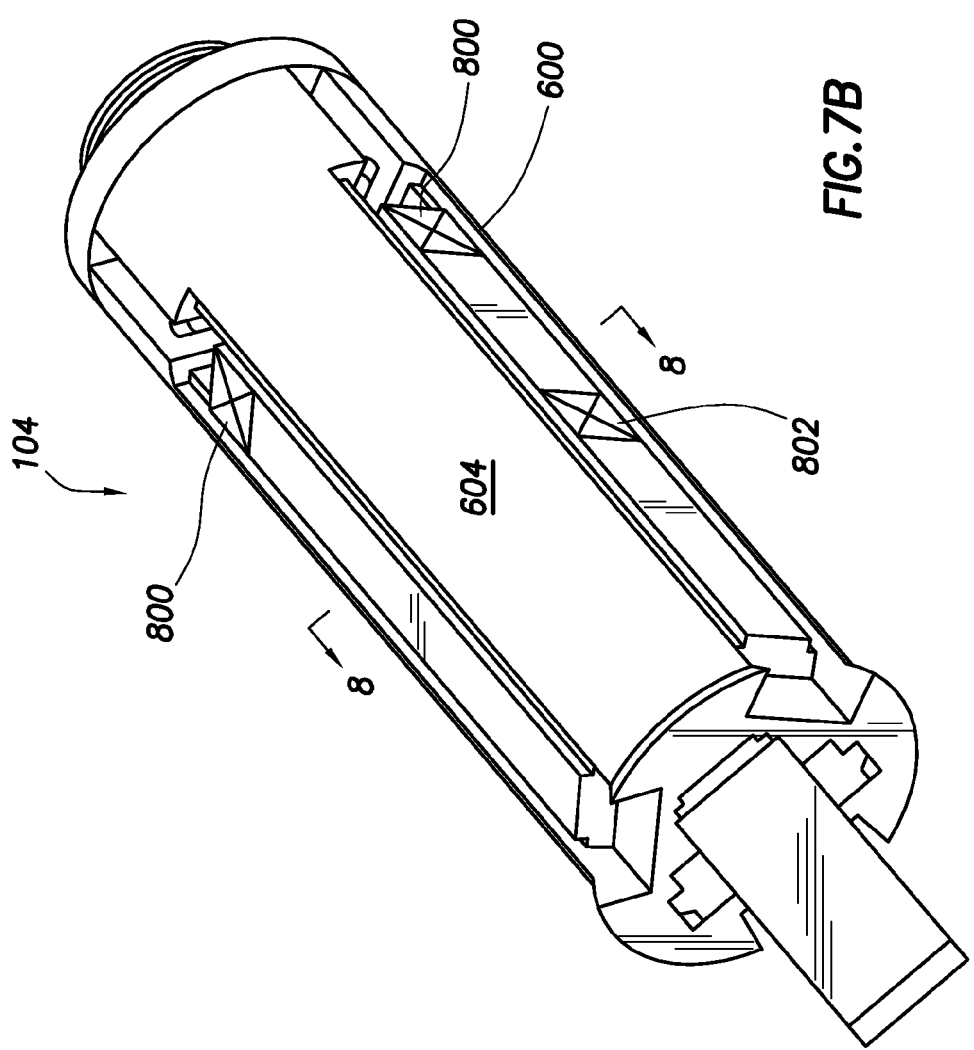

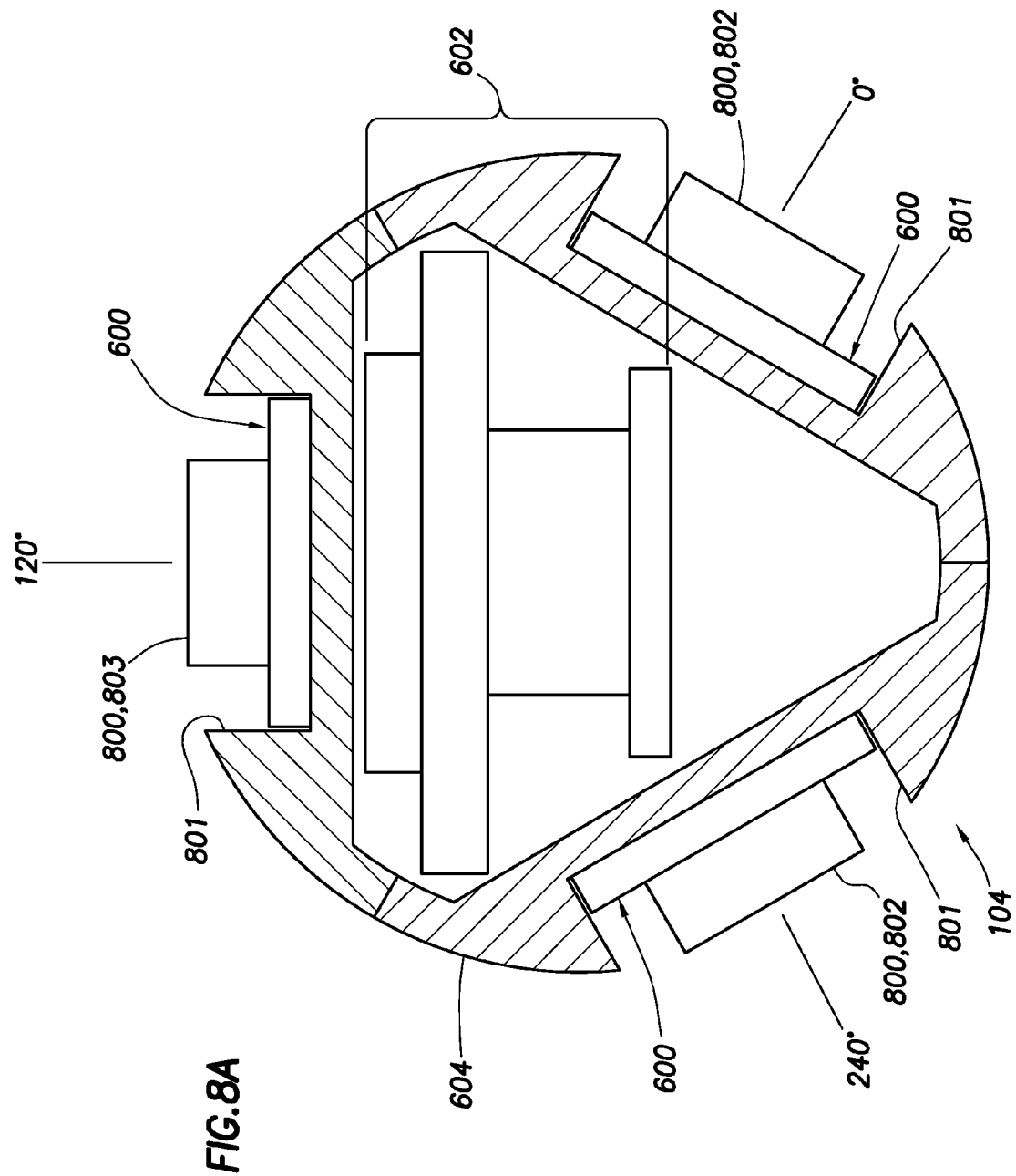

DOWNHOLE SENSOR ASSEMBLY AND METHOD OF USING SAME

CROSS REFERENCE TO RELATED APPLICATIONS

This application claims the benefit of U.S. Provisional Application No. 61/382,817 filed on Sep. 14, 2010, the entire contents of which are hereby incorporated by reference.

BACKGROUND

1. Field

The present disclosure relates generally to techniques for performing wellsite operations. More specifically, the present disclosure relates to techniques for sensing one or more downhole parameters, for example, vibration, global accelerations, revolutions per minute (RPM), whirl (and whirl parameters), and stick slip.

2. Description of Related Art

Oilfield operations are typically performed to locate and gather valuable downhole fluids. Oil rigs are positioned at wellsites, and downhole tools, such as drilling tools, are deployed into the ground to reach subsurface reservoirs. Once the downhole tools form a wellbore to reach a desired reservoir, casings may be cemented into place within the wellbore, and the wellbore completed to initiate production of fluids from the reservoir. During drilling and other wellsite operations, sensors may be located downhole to determine one or more downhole parameters. Some sensors may measure drilling parameters, such as the inclination and azimuth of the downhole tool.

Sensors may provide valuable information about the downhole tools and/or equipment during the drilling and/or wellbore operations. For example, sensors such as inclination and azimuth sensors may be used during drilling to determine the drilling direction. Noise from the downhole equipment, such as the drill bit, may interfere with the performance of the sensors. In some cases, the sensors may be located away from the noise source, such as the drill bit, in order to reduce the noise interference with the sensor. Some examples of sensors are provided in U.S. Patent/Application Nos. 2007/0203651, U.S. Pat. Nos. 7,798,246, 7,363,717, 7,252,144, 7,082,821, 6,966,211, 6,842,699, 6,712,159, 6,529,834, 6,227,044, 5,646,611, 5,467,083, 5,448,227, 5,226,332, 4,903,245, 4,845,434, 4,739,262, and 4,013,945.

Despite the development of techniques involving downhole sensors, there remains a need to provide advanced techniques for sensing downhole parameters. The present disclosure is directed to fulfilling these needs.

SUMMARY

In at least one aspect, the disclosure relates to a sensor assembly for determining downhole parameters. The sensor assembly is positionable in a downhole tool deployable into a subterranean formation to form a wellbore. The sensor assembly includes a carrier with at least one set of three receptacles (the set of three receptacles positioned radially about a periphery of the carrier at equal distances thereabout), at least one set of accelerometers (each of the sets of accelerometers having three accelerometers correspondingly positionable in the set of three receptacles), and at least one set of magnetometers (each of the sets of magnetometers having two physical magnetometers and one virtual magnetometer correspondingly positionable in the set of three receptacles).

The sensor assembly may also include at least one set of three sensor boards correspondingly positionable in the set of three receptacles for supporting the set of accelerometers and the set of magnetometers therein. The set of three receptacles may include a first set of three receptacles having the at least one set of accelerometers therein and a second set of three receptacles having the set of magnetometers therein.

The sensor assembly may also include a deployment device for housing the carrier. The deployment device may include an end cap for internal access thereof. The deployment device may be positionable within a drill collar of the downhole tool. The deployment device may be positionable about a drill bit of the downhole tool. The deployment device may include at least one centralizer on a periphery thereof for supporting the deployment device in the downhole tool. The sensor assembly may also include a power source and/or a connector for operatively connecting the power source to the carrier.

The set of three receptacles may include a first set of three receptacles with each of the three receptacles at 120 degree angles about the carrier. The set of three receptacles may include a second set of three receptacles with each of the three receptacles at 120 degree angles about the carrier (the second set of three receptacles offset from the first set of three receptacles by 60 degrees). The downhole parameters may be lateral vibration, axial vibration, torsional vibration, revolutions per minute (RPM), whirl, bit whirl, stick slip, local acceleration, global acceleration, displacement, and/or strain. The sensor assembly may also include control electronics.

In another aspect, the disclosure relates to a system for determining downhole parameters of a wellbore penetrating a subterranean formation. The system includes a downhole tool deployable into the subterranean formation to form the wellbore (the downhole tool having a bit at an end thereof) and a sensor assembly positionable in the downhole tool. The sensor assembly includes a carrier with at least one set of three receptacles (the set of three receptacles positioned radially about a periphery of the carrier at equal distances thereabout), at least one set of accelerometers including three accelerometers correspondingly positionable in the set of three receptacles, and at least one set of magnetometers including two physical magnetometers and one virtual magnetometer correspondingly positionable in the set of three receptacles.

The system may also include a surface unit operatively linked to the downhole tool for communication therewith, and/or sensors in the downhole tool. The sensors may be a gyroscopic sensor, a pressure sensor, a temperature sensor, a strain gauge sensor, a logging tool, and/or a measurement while drilling tool.

Finally, in yet another aspect, the disclosure relates to a method for determining downhole parameters. The method involves deploying a downhole tool into the subterranean formation (the downhole tool having a downhole sensor assembly including a carrier comprising at least one set of three receptacles positioned radially about a periphery of the carrier at equal distances thereabout, at least one set of accelerometers including three accelerometers correspondingly positionable in the set of three receptacles, and at least one set of magnetometers including two physical magnetometers and one virtual magnetometer correspondingly positionable in the set of three receptacles), sensing downhole parameters with the downhole sensor assembly, and generating at least one drilling parameter from the sensed downhole parameters.

The method may also involve determining a position of one of the three accelerometers, determining global coordinates of the three accelerometers, determining an angular acceleration of the downhole tool, determining bit whirl from the angular acceleration, measuring a magnetic field with the physical magnetometers and angular acceleration with the accelerometers, producing the virtual magnetometer from the measured magnetic field and the angular acceleration, determining revolutions per minute from the two physical magnetometers and the virtual magnetometer, and/or sensing downhole parameters using a sensor in the downhole tool

BRIEF DESCRIPTION DRAWINGS

So that features and advantages of the present disclosure can be understood in detail, a more particular description may be had by reference to embodiments that are illustrated in the appended drawings. It is to be noted, however, that the appended drawings illustrate only typical embodiments and are, therefore, not to be considered limiting, for other equally effective embodiments may be considered. The Figures are not necessarily to scale, and certain features and certain views of the Figures may be shown exaggerated in scale or in schematic in the interest of clarity and conciseness.

FIGS. 7A and 7B are perspective views of the sensor assembly of FIG. 6.

FIG. 8A is a cross-sectional view of the sensor assembly of FIG. 7B taken along line 8-8.

DETAILED DESCRIPTION

The description that follows includes exemplary apparatus, methods, techniques, and instruction sequences that embody techniques of the subject matter herein. However, it is understood that the described embodiments may be practiced without these specific details.

The techniques herein are directed at providing enhanced measurement of downhole parameters, such as revolutions per minute (RPMs), local accelerations, global accelerations, whirl (and parameters for whirl), displacement, stick slip, and/or other drilling parameters. These techniques may also seek to address measurement error (e.g., error caused by noise), to enhance interchangeability and/or to simplify measurements. In particular, these techniques may be usable in harsh conditions, such as high vibration equipment.

Figure 1:
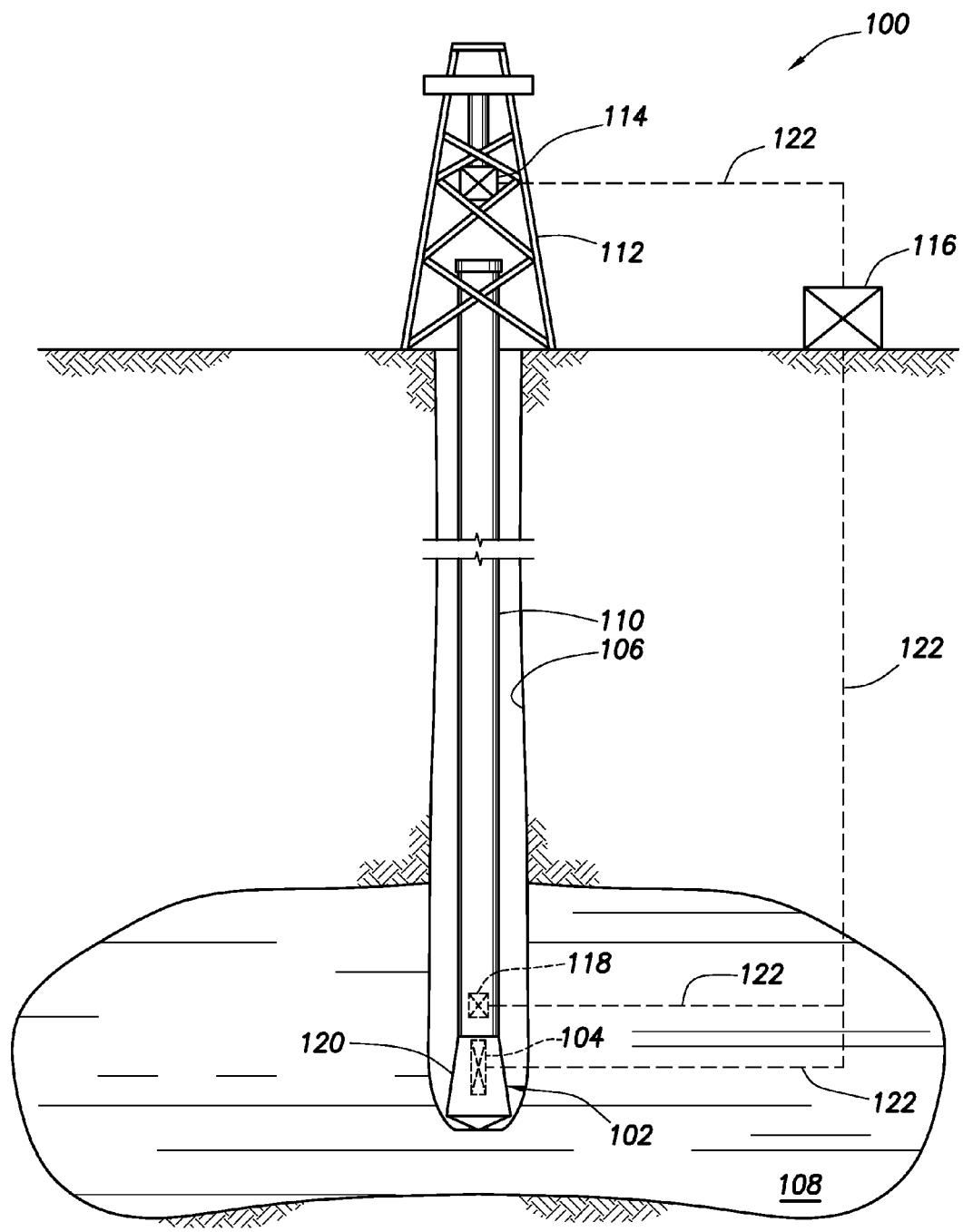
FIG. 1 shows a schematic view of a wellsite having a downhole tool with a sensor assembly for determining one or more downhole parameters.

FIG. 1 shows a schematic diagram depicting a wellsite 100 with a system for determining downhole parameters including a downhole tool 102 with a sensor assembly 104. As shown, the wellsite 100 is a land based wellsite, but could also be water based. The wellsite 100 may have a wellbore 106 which has been formed in the earth to access valuable fluids in one or more reservoirs 108. The wellsite 100 may include any number of associated wellsite equipment, such as the downhole tool 102, a conveyance 110, a drilling rig 112, a hoisting device 114 and a controller 116.

The sensor assembly 104 may be configured to measure one or more downhole parameters. The sensor assembly 104 may use specifically oriented magnetometers and/or accelerometers to measure the downhole parameters, as will be described in more detail below. The downhole parameters may be any suitable parameter of the downhole tool 102 such as vibration (e.g., lateral, axial, torsional, etc.), revolutions per minute (RPM), whirl (and whirl parameters), bit whirl, stick slip, local acceleration, global acceleration, displacement, strain, and the like. In addition to the sensor assembly 104, there may be one or more additional sensors 118 located proximate to, or at distances from, the sensor assembly 104, e.g., in another sensor assembly. The additional sensors 118 may be any suitable sensor for determining one or more downhole parameters, such as a gyroscopic sensor, a pressure sensor, a temperature sensor, a strain gauge sensor, a logging tool, a measurement while drilling tool, and the like. The additional sensors 118 may be used independently or in combination with the sensor assembly 104.

The downhole tool 102, as shown, has a drill bit 120 configured to form the wellbore 106. The sensor assembly 104 may be configured to be housed in the drill bit 120, as will be discussed in more detail below. Although the downhole tool 102 is shown as having a drill bit 120, the downhole tool 102 may be any suitable tool for performing downhole operations such as a drill collar, a pump, a logging tool, combinations thereof, and the like. Although the sensor assembly 104 is shown and described as being located within the downhole tool 102, the sensor assembly 104 may be located at any suitable downhole location, such as in a drill collar, in an annulus of a drill collar, on the outside of a drill collar, about a drill bit, and/or in other downhole locations.

The conveyance 110 may be any suitable conveyance for delivering the downhole tool 102 into the wellbore 106. For example, the conveyance 110 may be a drill string, a casing string, a coiled tubing, a wire line, a slick line, and the like.

The controller 116 may send and receive signals about the wellsite 100 via one or more communication links 122. The controller 116 may be used to control the equipment at the wellsite 100, such as the downhole tool 102, the hoisting device 114, one or more slips (not shown), one or more pump systems (not shown), the sensor assembly 104, the additional sensors 118, and the like. Further, the controller 116 may receive data from the sensor assembly 104 and/or the additional sensors 118. The data received by the controller 116 may be used to evaluate and/or manipulate wellsite operations.

Figure 2:
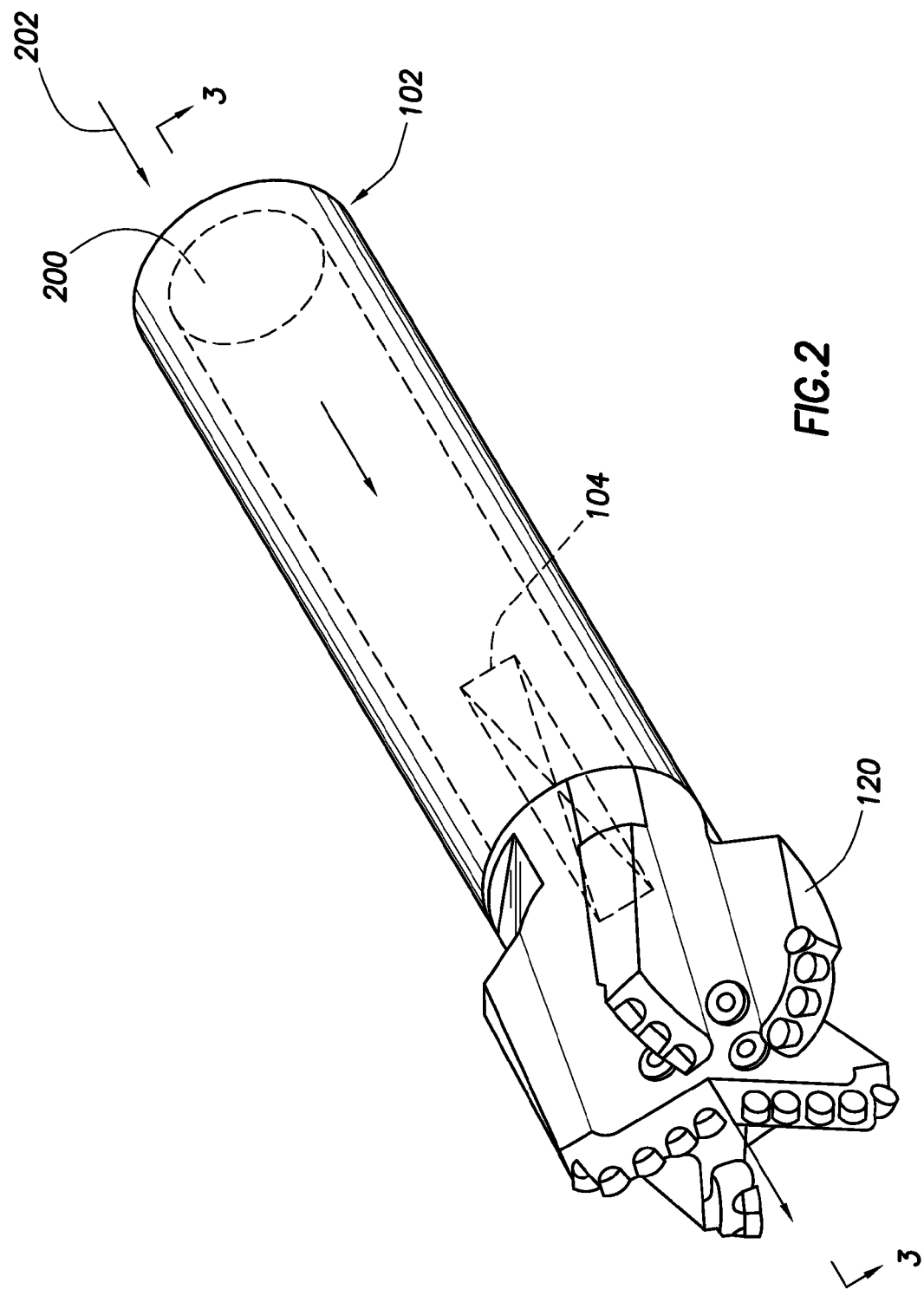
FIG. 2 shows a perspective view of a portion of the downhole tool of FIG. 1.

FIG. 2 depicts a perspective view of a portion of the downhole tool 102 with the drill bit 120. The drill bit 120 may be any suitable drill bit for forming the wellbore 106 (as shown in FIG. 1). The drill bit 120 may have a flow path 200 for allowing fluids 202, such as drilling mud, to flow through the drill bit 120 in order to lubricate the drill bit and/or wash away cuttings. The sensor assembly 104 may be located within the flow path 200 of the drill bit 120 during run in and drilling operations.

Figure 3:
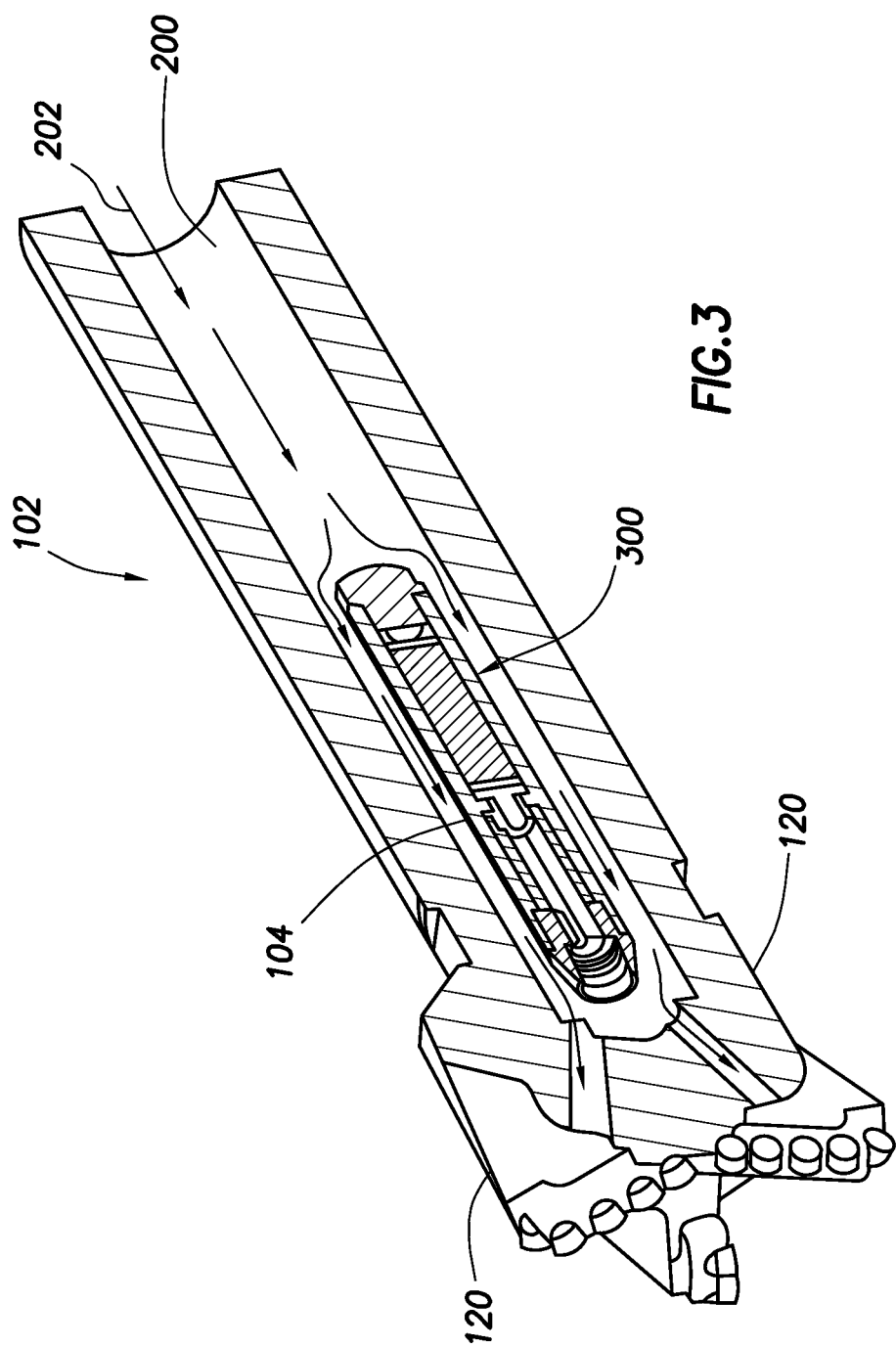
FIG. 3 is a cross-sectional view of a portion of the downhole tool of FIG. 2 taken along line 3-3 and having a deployment device.

FIG. 3 depicts a longitudinal cross-sectional view of the downhole tool 102 with the drill bit 120 of FIG. 2. The sensor assembly 104 may include a deployment device 300. The deployment device 300 may secure the sensor assembly 104 within the downhole tool 102 and/or protect the sensor assembly 104 from the downhole environment. The deployment device 300 may be configured to be secure in the flow path 200 while allowing the fluid 202 to flow past the deployment device 300. The deployment device 300 may be secured in the drill bit 120 prior to coupling the drill bit 120 to the conveyance 110 (as shown in FIG. 1), or the deployment device 300 may be dropped and/or run into the conveyance 110 and configured to land in the drill bit 120 and/or other portions of the downhole tool 102. The deployment device 300 may, therefore, be placed in the drill bit prior to the start of the drilling process. Further, the deployment device 300 may be located in any suitable sub, bit, pipe, or other downhole tool.

Figure 4:
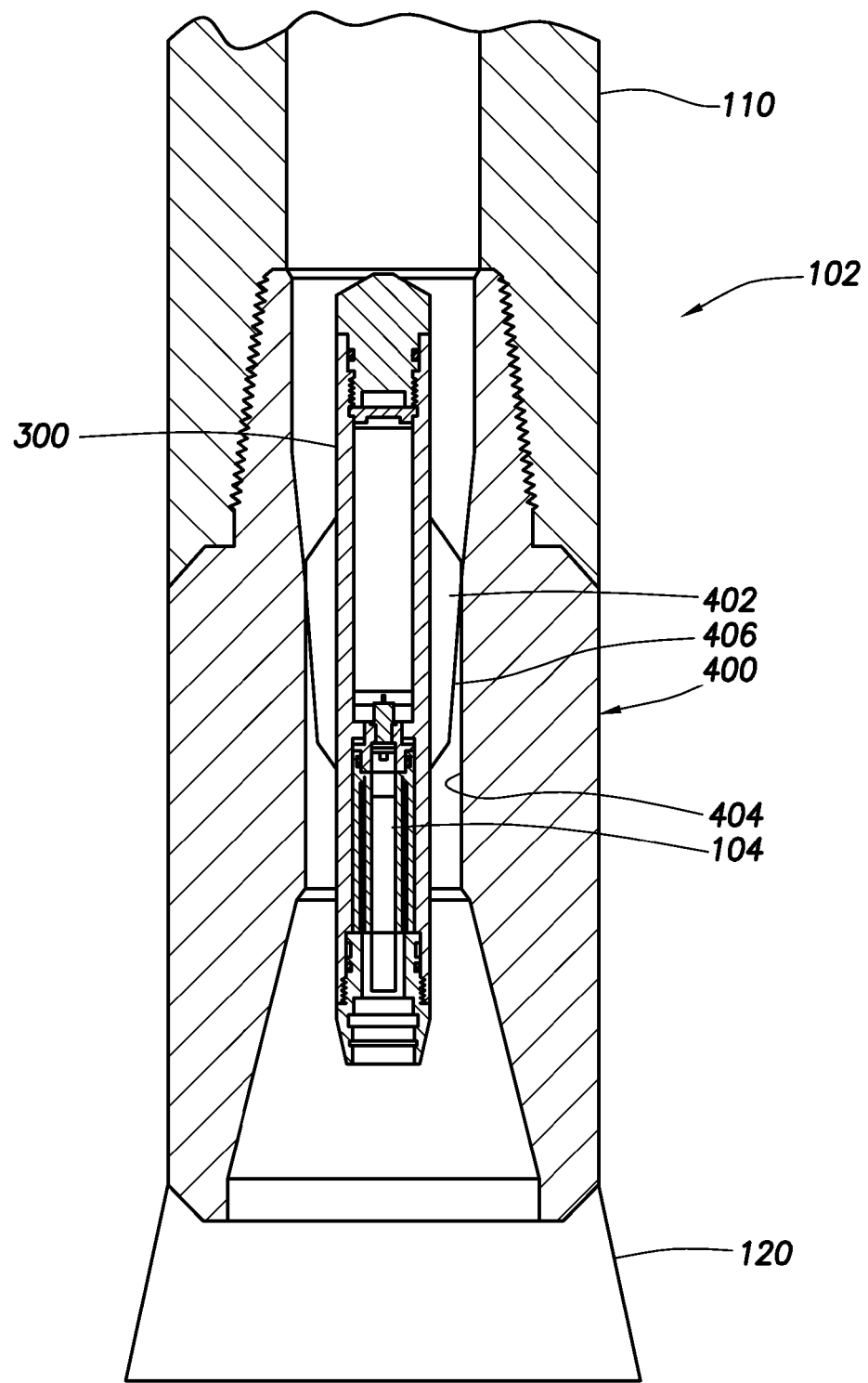
FIG. 4 is a partial cross-sectional view of a portion of a downhole tool depicting a sensor assembly.

FIG. 4 depicts a partial longitudinal cross-sectional view of a drill collar 400 for coupling the drill bit 120 (shown schematically) with the conveyance 110. The deployment device 300 may support the sensor assembly 104 in the drill collar. The deployment device 300 may have one or more centralizers 402 for engaging an inner wall 404 of the drill collar 400. The centralizers 402 are shown as being a fin with a tapered outer surface 406. The tapered outer surface 406 may be configured to wedge the deployment device 300 in the downhole tool 102. Although the centralizer 402 is shown as one or more fins with tapered outer surface 406, the centralizers 402 may have any suitable shape.

Figure 5:
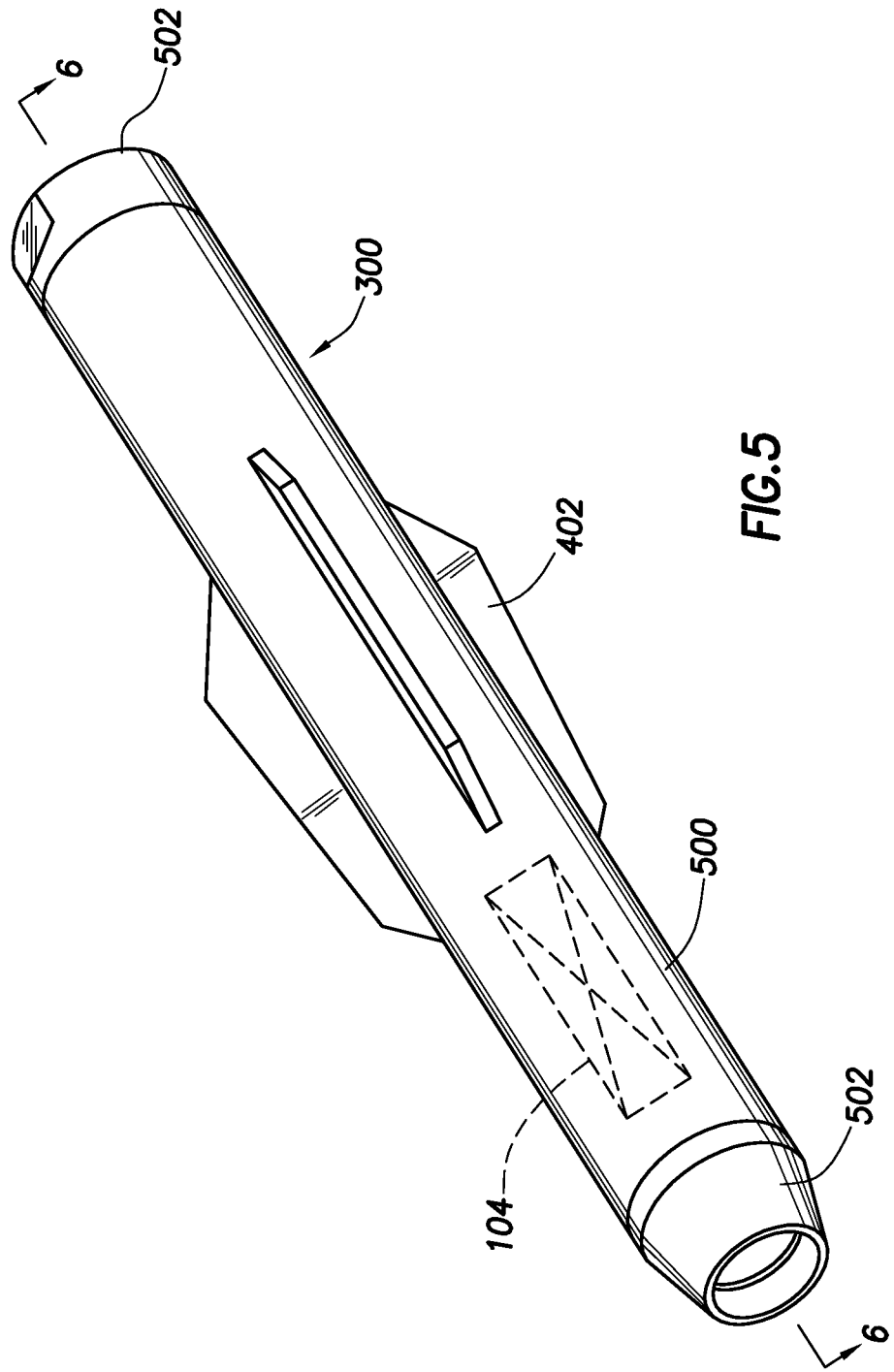
FIG. 5 is a perspective view of the deployment device of FIG. 3.

FIG. 5 depicts a perspective view of the deployment device 300 of FIG. 3. The deployment device 300 may have the centralizers 402, a housing 500, and one or more end caps 502. The end caps 502 may secure to each end of the housing 500 in order to seal the sensor assembly 104 within the deployment device 300. The housing 500 and end caps 502 may protect the sensor assembly 104 from the downhole environment.

Figure 6:
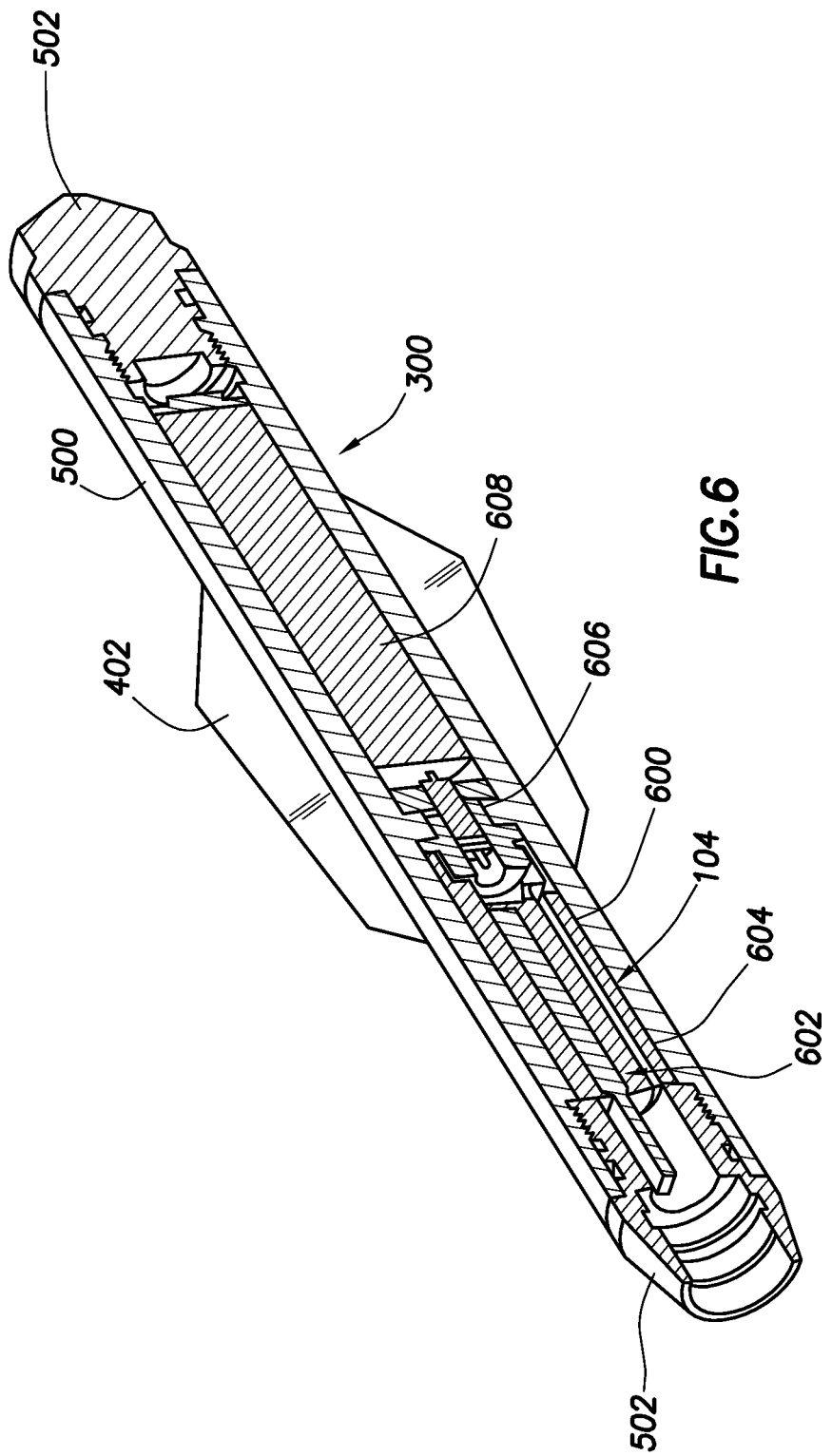
FIG. 6 is a cross-sectional view of the deployment device of FIG. 5 taken along line 6-6 and depicting the sensor assembly.

FIG. 6 is a longitudinal cross-sectional view of the deployment device 300 of FIG. 5 taken along line 6-6. The sensor assembly 104 may also include a plurality of sensor boards 600, control electronics 602, a carrier 604, and a connector 606. The connector 606 may be any suitable connector, and/or conductor for coupling the sensor assembly 104 to a power source 608. The power source 608, as shown, is a battery; however, the power source 608 may be any suitable power source or generator supplied either in the downhole tool 102 (as shown in FIG. 1) or supplied from the surface via, for example, a wire line.

The carrier 604 may be any suitable device for securing the sensor boards 600 and/or the control electronics 602 in the deployment device 300. As shown, the sensor assembly 104 may be a removable and/or replaceable electronics package. For example, one of the end caps 502 of the deployment device 300 may be removed and the sensor assembly 104 may be removed and/or replaced from the deployment device 300.

FIGS. 7A and 7B depict perspective views of the sensor assembly 104 of FIG. 1. As shown, the sensor assembly 104 may include a plurality of sensor boards 600 specifically oriented about the carrier 604 for detecting the downhole parameters. The sensor boards 600 may be positioned in carrier 604 and have an accelerometer 800 and/or a magnetometer 802 (shown schematically). The sensor boards 600, as shown, are spaced symmetrically around the carrier 604 at 120° intervals. Although the sensor boards 600 are shown as being three sensor boards 600 that are at 120° angles about the carrier 604 (e.g., separated or spaced at 120° angle intervals), there may be any suitable number of symmetrically or otherwise suitably arranged sensor boards 600.

Although the sensor boards 600 are shown as being spaced at 120° angles, the sensor boards 600 may be, for example, may be placed at an angle in the range of, in some cases, about 90° to about 180° between receptacles. The sensor boards 600 may also be placed at various multiples of the angles, for example, in the case of six sensor boards spaced at 60° angles, or, for example, in the case of twelve sensor boards spaced at 30° angles, etc.

There may be three accelerometers 800 spaced about the carrier, and there may three magnetometers 802. Further, there may be only two physical magnetometers 802, as shown in FIG. 7B. When there are only two magnetometers 802, a third "virtual" magnetometer may be produced using magnetic field characteristics measured by the two magnetometers 802, as will be discussed in more detail below.

FIG. 8A depicts a cross-sectional view of the sensor assembly 104 of FIG. 7B taken along line 8-8. As shown, sensor assembly 104 has three accelerometers 800 on a circumference of carrier 604, and spaced at 120° intervals. The sensor assembly 104 may further have two or three magnetometers 802, e.g., near the circumference of the carrier 604 and spaced at 120° intervals. A virtual magnetometer 803 may also be provided.

The carrier 604 has receptacles 801 positioned about a periphery thereof. As shown, three receptacles 801 are distributed evenly about the periphery of the carrier 604 at 120 degree radial intervals. Each of the three accelerometers 800 are correspondingly positioned in each of the three receptacles 801. Each of the three magnetometers 802,803 are also correspondingly positioned in each of the three receptacles 801. One or more sets of three accelerometers 800 and the sets of three magnetometers 802,803 are positionable in the set of receptacles 801.

Figure 8B:
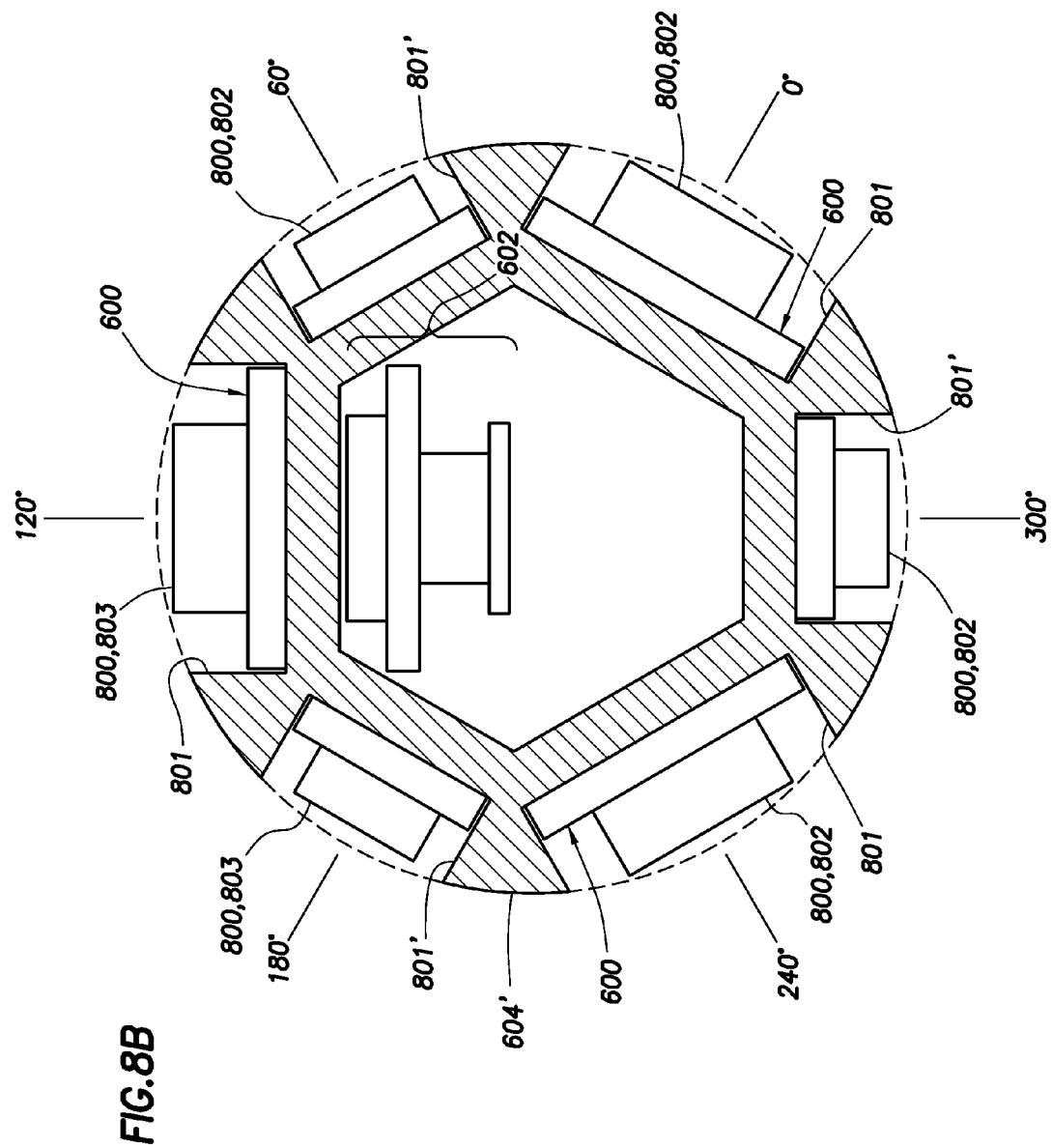
FIG. 8B is a schematic cross-sectional view of an alternate sensor assembly.

In some cases, there may be more than one set of three receptacles 801 and corresponding sets of accelerometers 800 and magnetometers 802,803 as shown in the carrier 604' of FIG. 8B. This figure schematically depicts two sets of three receptacles 801, 801' with a set of accelerometers 800 and a set of magnetometers 802,803 therein. Each set of receptacles 801,801' may include three receptacles distributed evenly about the periphery of the carrier 604. In a given example, three receptacles 801 of a first set of receptacles may be positioned at 0 degrees, 120 degrees and 240 degrees about the carrier, and three receptacles 801' of a second set of receptacles may be positioned at 60 degrees, 180 degrees and 300 degrees about the carrier. Additional sets may be positioned about the carrier 604' such that all receptacles within a set are evenly distributed about the periphery of the carrier 604'. In some arrangements, some receptacles may house only accelerometers (e.g., in receptacles 801) and other receptacles house only magnetometers (e.g., in receptacles 801') about the carrier.

Referring again to FIG. 8A, the control electronics 602 may be located within the carrier 604 to control and/or operate the sensor boards 600. In some cases, the control electronics 602 may include layers of circuits and related components in various configurations (e.g., a primary processor, a memory board, an interconnect, a transmitter/receiver-related components and/or other electrical components). Spaced magnetometers 802 and accelerometers 800 may be used to give an accurate high resolution RPM, local accelerations, global accelerations, torsional vibration (axial, lateral, or torsional), whirl (and whirl parameters), bit whirl, displacement, stick slip, strain, and/or other measurements for the downhole tool 102 (as shown in FIG. 1). These devices may also be used, for example, when used as a measurement while drilling (MWD) or logging-while-drilling (LWD) tool.

Figure 9:
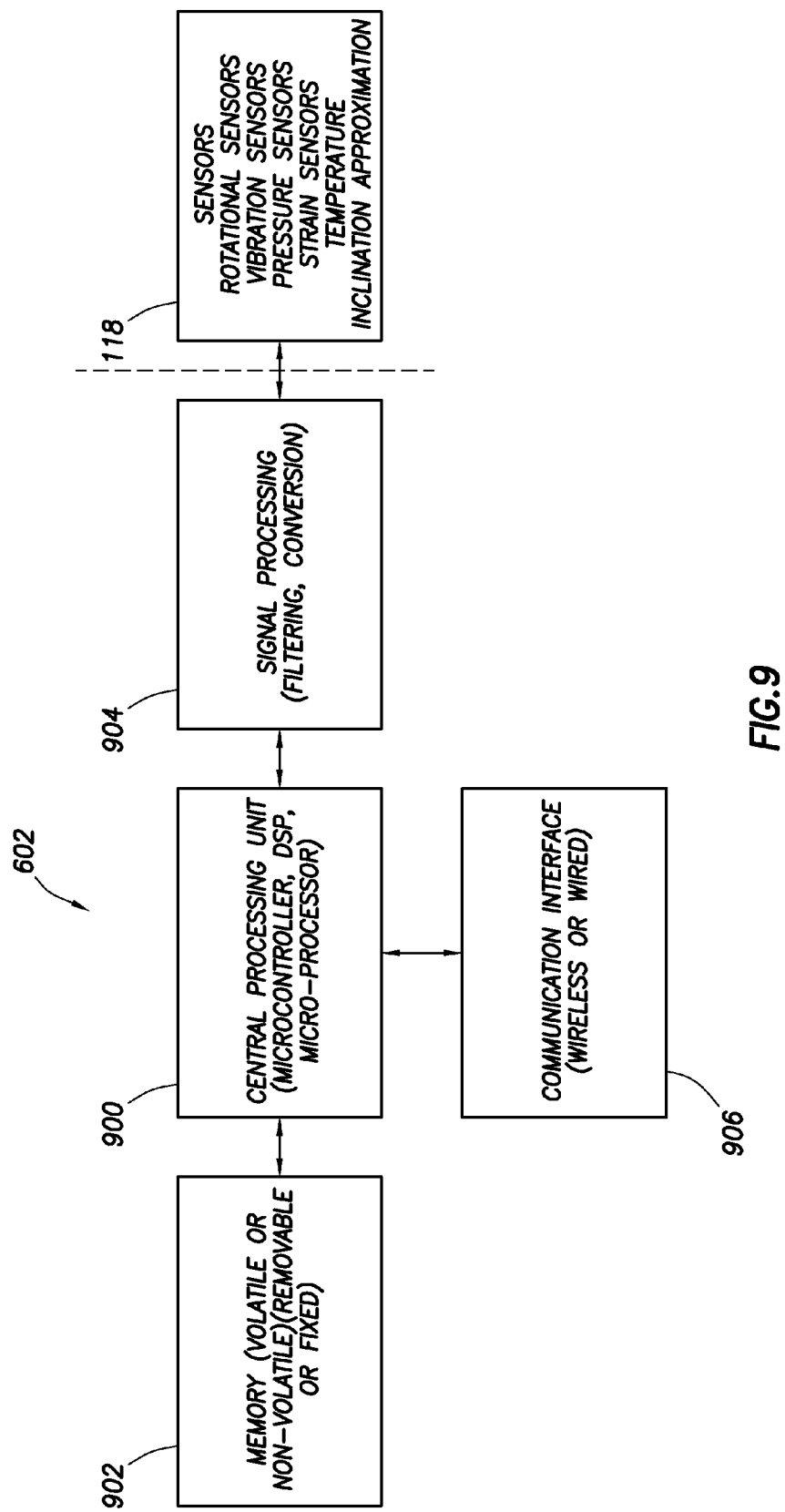
FIG. 9 is a schematic diagram of control electronics for a sensor assembly.

FIG. 9 shows a schematic view of the control electronics 602. As shown, the control electronics 602 may have a central processing unit 900, a memory 902 (or storage device), a signal processor 904 (or processor), and a communication interface 906 (or transceiver). The communication interface 906 of the control electronics 602 may be connected to the sensor boards 600 and may send and receive data (e.g., gravitational or magnetic field characteristics) using any suitable communication device. Further, the control electronics 602 may be connected to the additional sensors 118 for communication therebetween. The control electronics 602 may be configured to determine the downhole parameters during a wellsite operation.

The control electronics 602 may store this data for access by an operator at a later time. The operator may then adjust a well plan, or wellsite operation, in the future based on the data. Further, the control electronics 602 may send this data to the operator during the wellsite operation (e.g., via a communication link 122 to controller 116, as shown in FIG. 1). With the data received during the wellsite operations, the operator may adjust the wellsite operation in real time in order to optimize the wellsite operation. For example, the operator may adjust the type of drilling techniques, and/or drilling equipment used during drilling, based on the data from the sensor assembly 104.

Figure 10:
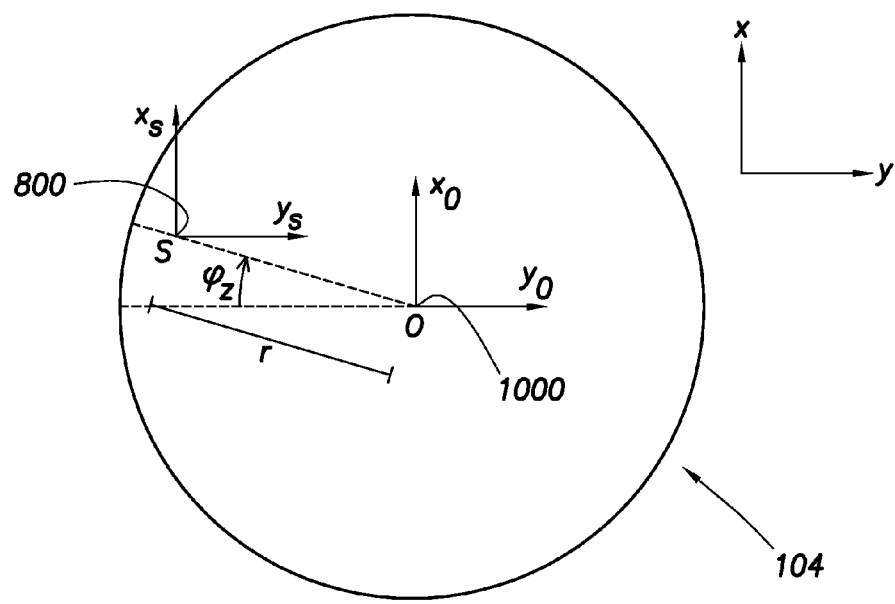
FIGS. 10-15 are schematic representations of a sensor assembly.
Figure 11:
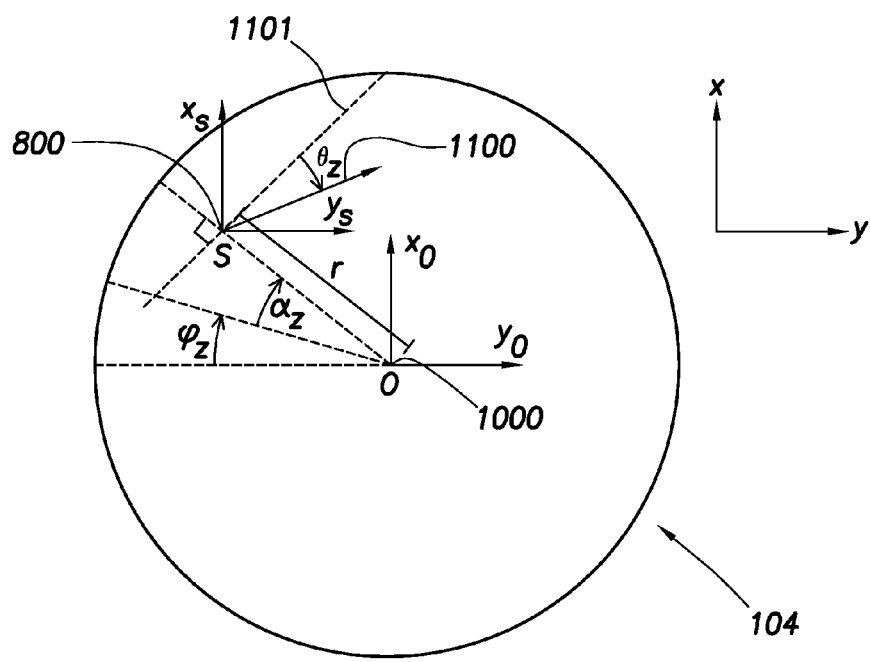
Figure 12:
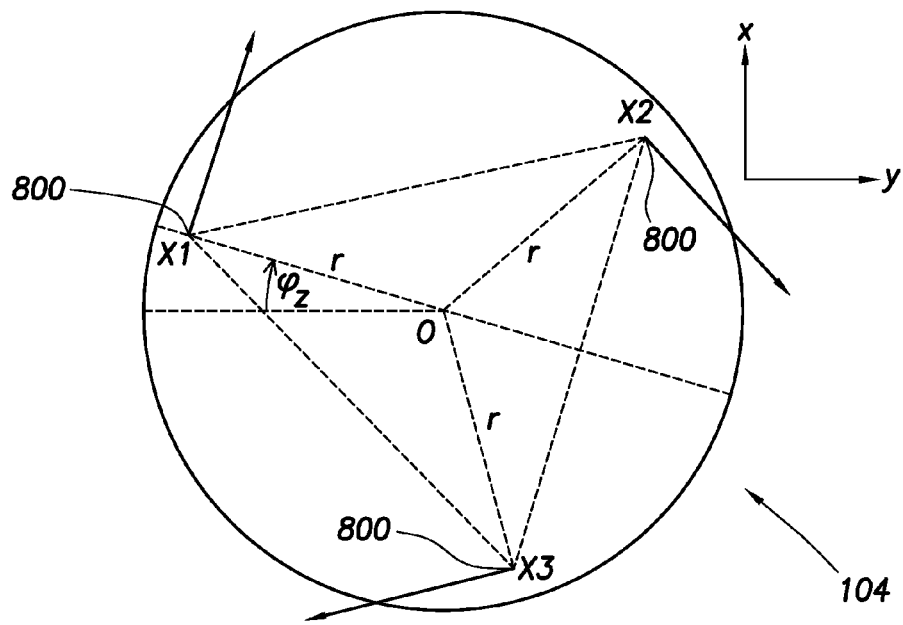

FIGS. 10, 11, and 12 depict a partial schematic representation of the sensor assembly 104 of FIG. 8. The accelerometers 800 may be used to determine downhole parameters, such as global acceleration and bit whirl, using the techniques described herein. The downhole parameters may be determined by determining coordinates of the accelerometers. The primary equations for the accelerometer 800 may be derived by assuming a single accelerometer 800 on the circumference of the rotating tool, or downhole tool 102 (as shown in FIG. 1). FIG. 10 shows that a center 1000 of the downhole tool at position O=$[x_0, y_0]$ and the position of the accelerometer 800 at S=$[x_S, y_S]$. The position S, velocity $\dot{S}$, and acceleration $\ddot{S}$, respectively, of point S in relation to O may be given by the following set of equations:

$$s = \begin{bmatrix} x_0 + r \cdot \sin(\phi_z) \\ y_0 - r \cdot \cos(\phi_z) \end{bmatrix} \quad \text{(Equation 1)}$$

$$\dot{s} = \begin{bmatrix} \dot{x}_0 + r \cdot \cos(\phi_z)\dot{\phi}_z \\ \dot{y}_0 + r \cdot \sin(\phi_z)\dot{\phi}_z \end{bmatrix} \quad \text{(Equation 2)}$$

$$\ddot{s} = \begin{bmatrix} \ddot{x}_0 + r \cdot (\cos(\phi_z)\ddot{\phi}_z - \sin(\phi_z)\dot{\phi}_z^2) \\ \ddot{y}_0 + r \cdot (\cos(\phi_z)\dot{\phi}_z^2 + \sin(\phi_z)\ddot{\phi}_z) \end{bmatrix} \quad \text{(Equation 3)}$$

where $\phi_z$ is the angle at which the accelerometer 800 is mounted on the downhole tool from the $-y_0$ axis, $\dot{x}_0$ and $\dot{y}_0$ are the X and Y components respectively of velocity, $\ddot{x}_0$ and $\ddot{y}_0$ are the X and Y components respectively of the acceleration, $\dot{\phi}_z$ is the single derivative of the angle $\phi_z$, and $\ddot{\phi}_z$ is the double derivative of the angle $\phi_z$.

Applying an arbitrary angle $\alpha_z$ (as shown in FIG. 11) from the $\phi_z$ position of FIG. 10, established by the equations above, and considering the effect of accelerometer 800, a sensitivity axis 1101, new position S, new velocity $\dot{S}$, and new acceleration $\ddot{S}$, respectively, may be defined with the following equations:

$$s = \begin{bmatrix} x_0 + r \cdot \sin(\phi_z + \alpha_z) \\ y_0 - r \cdot \cos(\phi_z + \alpha_z) \end{bmatrix} \quad \text{(Equation 4)}$$

$$\dot{s} = \begin{bmatrix} \dot{x}_0 + r \cdot \cos(\phi_z + \alpha_z)\dot{\phi}_z \\ \dot{y}_0 + r \cdot \sin(\phi_z + \alpha_z)\dot{\phi}_z \end{bmatrix} \quad \text{(Equation 5)}$$

$$\ddot{s} = \begin{bmatrix} \ddot{x}_0 + r \cdot (\cos(\phi_z + \alpha_z)\ddot{\phi}_z - \sin(\phi_z + \alpha_z)\dot{\phi}_z^2) \\ \ddot{y}_0 + r \cdot (\cos(\phi_z + \alpha_z)\dot{\phi}_z^2 + \sin(\phi_z + \alpha_z)\ddot{\phi}_z) \end{bmatrix} \quad \text{(Equation 6)}$$

Considering the sensitivity axis 1101 of the accelerometer 800, as depicted by FIG. 11, the actual acceleration vector 1100 may be seen as being projected onto the axis of sensitivity by rotating the acceleration vector 1100 by $-(\phi_z+\alpha_z+\theta_z)$ as shown on FIG. 11, which, in matrix operations, can be obtained by:

$$a = r \cdot \ddot{s} \quad \text{(Equation 7)}$$

where, $$r = [\cos(\phi + \alpha + \theta) \; \sin(\phi + \alpha + \theta)] \quad \text{(Equation 8)}$$

r may be obtained by collapsing the rotation matrix R, as the only required component may be along x-axis (and the y component may be meaningless). Therefore, via substitution in the acceleration calculation, the following equation may be derived:

$$a = [\ddot{x}_0 + r \cdot \ddot{\phi}_z \cdot (\cos(\phi_z + \alpha_z) - \sin(\phi_z + \alpha_z))] \cos(\phi + \alpha + \theta)$$

$$+ [\ddot{y}_0 + r \cdot \ddot{\phi}_z \cdot (\cos(\phi_z + \alpha_z) + \sin(\phi_z + \alpha_z))] \sin(\phi + \alpha + \theta) \quad \text{(Equation 9)}$$

Equation 9 may be replicated for all three accelerometers 800 mounted on a circumference of the downhole tool 102 tangentially as shown in FIG. 12. The parameters of FIG. 12 may be:

TABLE 1

| Accelerometer | $\phi_z$ | $\alpha_z$ | $\theta_z$ | radius |
|---|---|---|---|---|
| x1 | $\phi_z$ | 0 | 0 | r |
| x2 | $\phi_z$ | $2\pi/3$ | 0 | r |
| x3 | $\phi_z$ | $4\pi/3$ | 0 | r |

Substituting the values in Equation 9, and combining the three accelerometer values into one vector form, may yield the following equation:

$$\begin{bmatrix} a_{x1} \\ a_{x2} \\ a_{x3} \end{bmatrix} = \begin{bmatrix} \ddot{x}_0 \cos(\phi_z) + \ddot{y}_0 \sin(\phi_z) + r\ddot{\phi}_z \\ \ddot{x}_0 \cos(\phi_z + 2\frac{\pi}{3}) + \ddot{y}_0 \sin(\phi_z + 2\frac{\pi}{3}) + r\ddot{\phi}_z \\ \ddot{x}_0 \cos(\phi_z + 4\frac{\pi}{3}) + \ddot{y}_0 \sin(\phi_z + 4\frac{\pi}{3}) + r\ddot{\phi}_z \end{bmatrix} \quad \text{(Equation 10)}$$

Equation 10 may be simplified to:

$$\begin{bmatrix} a_{x1} \\ a_{x2} \\ a_{x3} \end{bmatrix} = \begin{bmatrix} \cos(\phi_z) & \sin(\phi_z) & r \\ \cos(\phi_z + 2\frac{\pi}{3}) & \sin(\phi_z + 2\frac{\pi}{3}) & r \\ \cos(\phi_z + 4\frac{\pi}{3}) & \sin(\phi_z + 4\frac{\pi}{3}) & r \end{bmatrix} \begin{bmatrix} \ddot{x}_0 \\ \ddot{y}_0 \\ \ddot{\phi}_z \end{bmatrix} \quad \text{(Equation 11)}$$

Equation 11 may then be inverted to:

$$\begin{bmatrix} \ddot{x}_0 \\ \ddot{y}_0 \\ \ddot{\phi}_z \end{bmatrix} = \begin{bmatrix} \frac{-2\sqrt{3}(\sin(\phi_{zx3})-\sin(\phi_{zx2}))}{9} & \frac{2\sqrt{3}(\sin(\phi_{zx3})-\sin(\phi_{zx1}))}{9} & \frac{-2\sqrt{3}(\sin(\phi_{zx2})-\sin(\phi_{zx1}))}{9} \\ \frac{2\sqrt{3}(\sin(\phi_{zx3})-\sin(\phi_{zx2}))}{9} & \frac{-2\sqrt{3}(\sin(\phi_{zx3})-\cos(\phi_{zx1}))}{9} & \frac{2\sqrt{3}(\cos(\phi_{zx2})-\cos(\phi_{zx1}))}{9} \\ \frac{1}{3r} & \frac{1}{3r} & \frac{1}{3r} \end{bmatrix} \begin{bmatrix} a_{x1} \\ a_{x2} \\ a_{x3} \end{bmatrix}$$ (Equation 12)

where $\phi_{zx1}=\phi_z$; $\phi_{zx2}=\phi_z+2\pi/3$; and $\phi_{zx3}=\phi_z-2\pi/3$.

Equation 12 may then be simplified to the following equations:

$$\sin(\alpha\pm\beta)=\sin\alpha\cos\beta\pm\cos\alpha\sin\beta \quad \text{(Equation 13)}$$

$$\cos(\alpha\pm\beta)=\cos\alpha\cos\beta\pm\sin\alpha\sin\beta \quad \text{(Equation 14)}$$

The accelerometer 800 arrangement, shown in FIG. 11, may be beneficial because it does not require an estimate of the revolutions per minute (RPM) to determine acceleration. The acceleration may be determined using global coordinates and hence there may be no dependence upon RPM. Another advantage may be the ability to sample and average the three accelerometers 800 to calculate angular acceleration. The above explained arrangement also helps in the calculation of bit whirl, which may be geometrically calculated by the following ellipse equation:

$$\begin{bmatrix} x_0 \\ y_0 \end{bmatrix} = \begin{bmatrix} h + a*\cos(t)\cos(\phi) - b*\sin(t)\sin(\phi) \\ k + b*\sin(t)\cos(\phi) + a*\cos(t)\sin(\phi) \end{bmatrix} \quad \text{(Equation 15)}$$

where, h and k represent the offset along the X and Y coordinates of the center of the ellipse and t=time. For example (h,k) may equal (0,0). Where the semi-major axis of the ellipse is "a", the semi-minor axis is "b", and the major axis rotated by angle $\phi$, the acceleration becomes:

$$\begin{bmatrix} \ddot{x}_0 \\ \ddot{y}_0 \end{bmatrix} = \begin{bmatrix} -a*\cos(t)\cos(\phi) + b*\sin(t)\sin(\phi) \\ -b*\sin(t)\cos(\phi) - a*\cos(t)\sin(\phi) \end{bmatrix} \quad \text{(Equation 16)}$$

The fast fourier transform (FFT) of Equation 16 may determine, for example, frequency, radius, direction of rotation, and whirl of the downhole tool 102 (as shown in FIG. 1).

Figure 13:
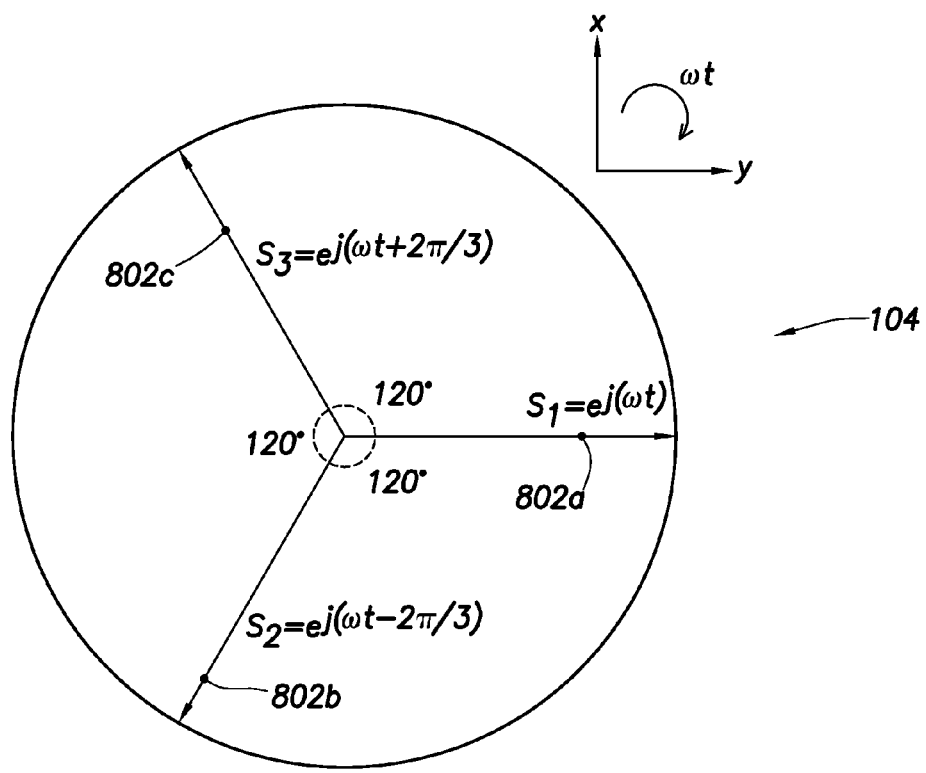
Figure 14:
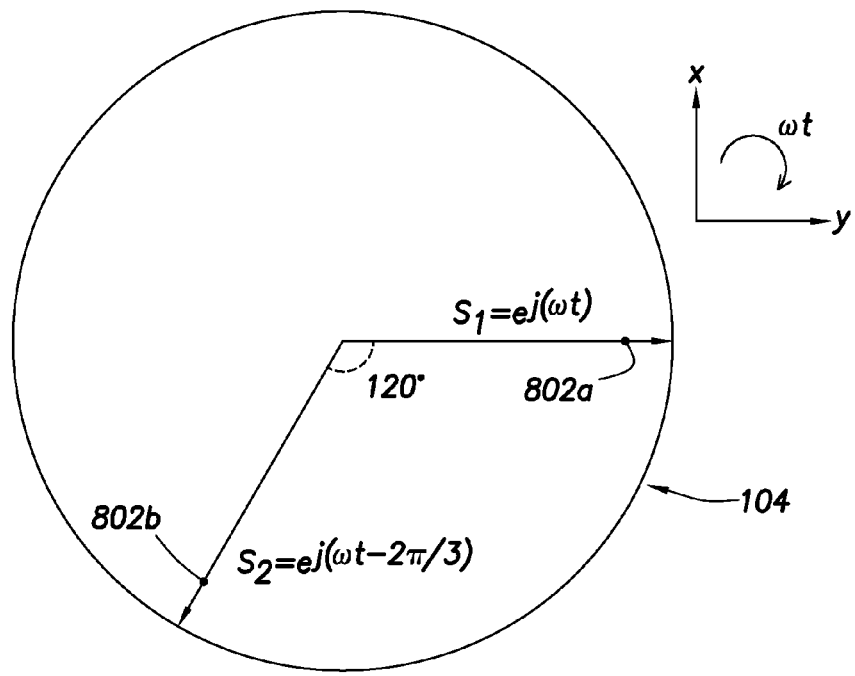
Figure 15:
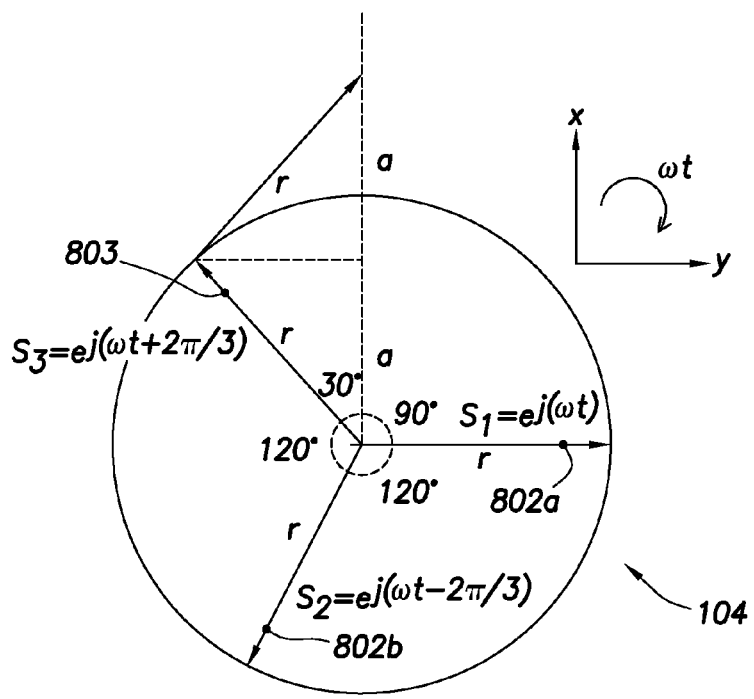

FIGS. 13, 14, and 15 also depict partial schematic representations of potential embodiments of sensor assembly 104 of FIG. 8. The physical magnetometers 802 of FIG. 8 may determine one or more downhole parameters using techniques described herein. The radially-oriented positioning at 120° angle intervals, as in FIG. 13, of three physical magnetometers 802a, 802b, and 802c (or, as in FIG. 15, of two physical magnetometers 802a and 802b, and "virtual" magnetometer 803) ensures that the magnetometers only see the real part of the phasor (magnetic field).

Magnetometer positioning may be denoted on FIG. 13 by $S_1$ (associated with reference no. 802a), $S_2$ (associated with reference no. 802b), and $S_3$ (associated with reference no. 802c), on FIG. 14 by $S_1$ (associated with reference no. 802a) and $S_2$ (associated with reference no. 802b), and on FIG. 15 by $S_1$ (associated with reference no. 802a), $S_2$ (associated with reference no. 802b), and $S_3$ (associated with reference no. 803). In reality, two magnetometers 802a and 802b (as shown in FIG. 14) spaced at a 120° angle interval may also serve the same purpose as three magnetometers 802a, 802b, and 802c (as shown in FIG. 13) spaced at 120° angle intervals. The two magnetometers 802a and 802b (as shown in FIGS. 14 and 15) may be adequate because a third magnetometer (such as virtual magnetometer 803 of FIG. 15) may be produced from the magnetic fields measured by the other two magnetometers 802a and 802b (as shown in FIG. 15).

The magnetometers output 112 may equal:

$$m_1 = \Re\{s_1\} = \cos(\omega t) \quad \text{(Equation 17)}$$

$$m_1 = \Re\{s_1\} = \cos(\omega t - 2\pi/3) \quad \text{(Equation 18)}$$

where $\Re$ may be a real value component of the magnetometer and $\omega$ may be the angular acceleration. Thus, a third (or virtual) magnetometer may be produced, or calculated using geometry, by:

$$m_1 + m_2 + m_3 = 0 \quad \text{(Equation 19)}$$

For the measurement equation to be true, the two magnetometers $m_1$ and $m_2$ may need to be scaled exactly the same, and may need to be DC or AC coupled. Therefore, the two magnetometers 802a and 802b (as shown in FIG. 15) may perform similarly to three magnetometers 802a, 802b, and 802c (as shown in FIG. 13) due to the specific geometric positions of the magnetometers 802a and 802b (as shown in FIG. 15). Therefore, by performing a piece-wise differentiation on the combined signals from the two magnetometers 802a and 802b may yield an accurate RPM of the downhole tool.

Equations 20 and 21 are equations associated with positions of magnetometers 802a and 802b, respectively, of FIGS. 13, 14, and 15:

$$S_1 = e^{j(\omega t)} \quad \text{(Equation 20)}$$

$$S_2 = e^{j(\omega t - 2\pi/3)} \quad \text{(Equation 21)}$$

Equation 22 is an equation associated with positions of magnetometers 802c of FIG. 13 and magnetometer 803 of FIG. 15:

$$S_3 = e^{j(\omega t + 2\pi/3)} \quad \text{(Equation 22)}$$

Figure 16:
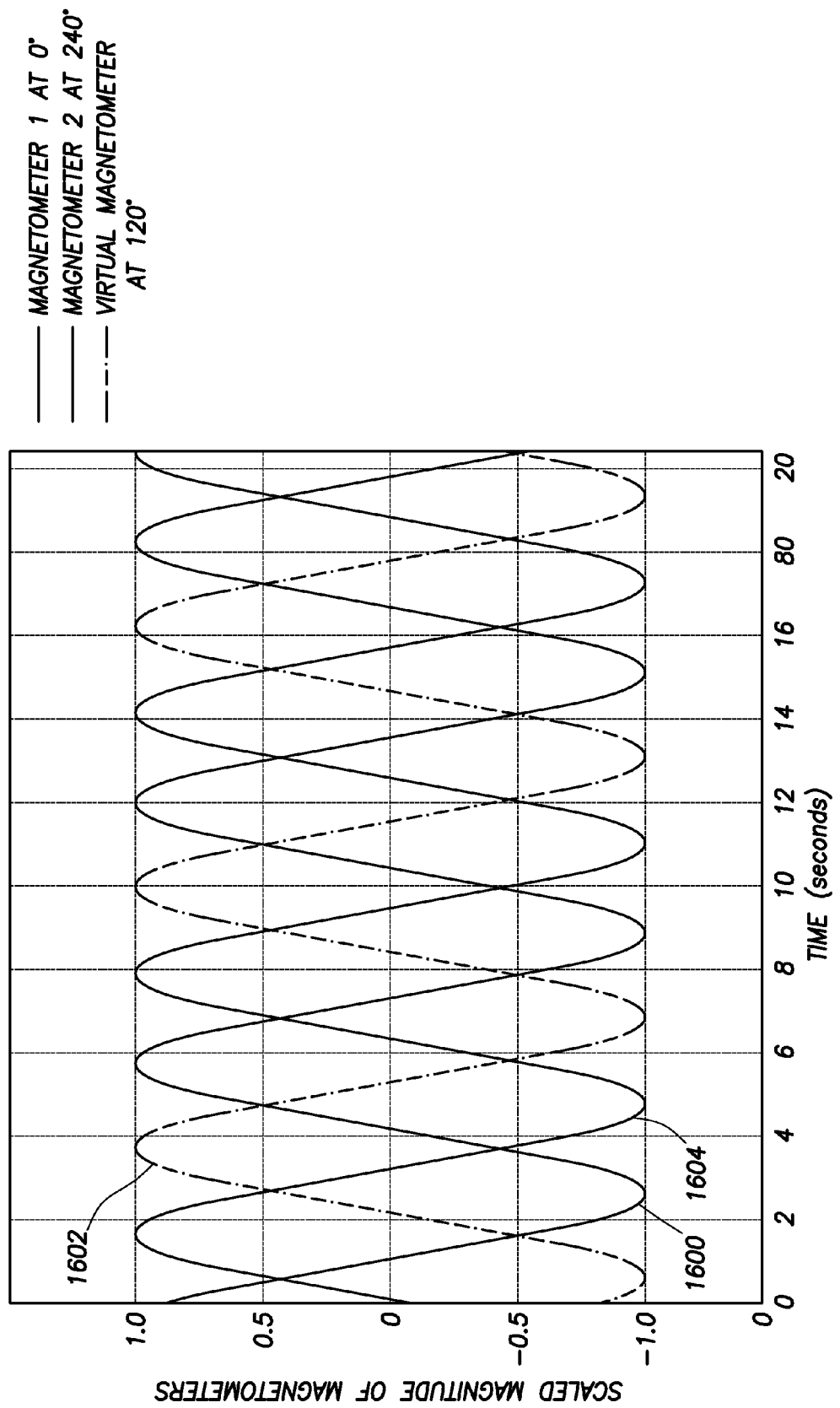
FIG. 16 is a graphic depiction of cosine waves of a sensor assembly.

The positioning of magnetometers 802 may help in determining global accelerations. From FIGS. 14 and 15, sine and cosine values may be determined for Equation 15 by using the three phase orientation of the two physical magnetometers 802 (such as magnetometers 802a and 802b) and virtual magnetometer 803. FIG. 16 is a graphic of time (X-axis) versus magnetometer-scaled magnitude (Y-axis). Three cosine values 1600, 1602, and 1604, calculated in Equations 23 and 24 via the signals, are shown, and the remaining three sine values can be derived algebraically using Equations 25 through 27:

$$S_3 - S_2 = e^{j(\omega t + 2\pi/3)} - e^{j(\omega t - 2\pi/3)} \quad \text{(Equation 23)}$$

$$S_3 - S_2 = e^{j\omega t}(e^{j2\pi/3} - e^{-j2\pi/3}) \quad \text{(Equation 24)}$$

$$S_3 - S_2 = e^{j\omega t} \cdot 2j \cdot \sin(2\pi/3) \quad \text{(Equation 25)}$$

$$S_3 - S_2 = \sqrt{3} e^{j\pi/2} \cdot e^{j\omega t} \quad \text{(Equation 26)}$$

$$S_3 - S_2 = \sqrt{3} e^{j(\omega t + \pi/2)} \quad \text{(Equation 27)}$$

where, j may represent the presence of an imaginary component. Now, scaling by $1/\sqrt{3}$, and replacing $\omega^* t$ with $\phi_z$, values for Equation 12 may be determined.

$$\cos(\phi_z) = m_1 \quad \text{(Equation 28)}$$

$$\cos\left(\phi_z - \frac{2\pi}{3}\right) = m_2 \quad \text{(Equation 29)}$$

$$\cos\left(\phi_z + \frac{2\pi}{3}\right) = -(m_1 + m_2) \quad \text{(Equation 30)}$$

$$\sin(\phi_z) = \frac{(m_3 - m_2)}{\sqrt{3}} = \frac{(-m_1 - 2m_2)}{\sqrt{3}} \quad \text{(Equation 31)}$$

$$\sin\left(\phi_z - \frac{2\pi}{3}\right) = \frac{(m_1 - m_3)}{\sqrt{3}} = \frac{(2m_1 + m_2)}{\sqrt{3}} \quad \text{(Equation 32)}$$

$$\sin\left(\phi_z + \frac{2\pi}{3}\right) = \frac{(m_2 - m_1)}{\sqrt{3}} \quad \text{(Equation 33)}$$

Hence, cosine and sine values may be simplified to a calculation involving magnetometer 802 signals. These calculations may be used to determine global accelerations, which in turn may be used for, e.g., whirl and accurate RPM values, which the logging-while-drilling (LWD) tool may store in its memory.

The arrangement of magnetometers 802 at the specific angles from each other and at a distance from the center of the carrier 604 and/or the downhole tool 102 may generate measurements from two magnetometers 802 which may be used to produce a third magnetometer, i.e., virtual magnetometer 803. The three signals from these three magnetometers may then be combined with signals from the three specifically oriented accelerometers to give an RPM value of the downhole tool 102. This may alleviate the need for a counter in calculating RPM, and the magnetometer arrangement may be used to record RPM. A combination of two physical magnetometers 802, a virtual magnetometer 803, and three accelerometers 800 may further be used to determine the RPM and bit whirl.

The data from the sensor boards 600 (e.g., from accelerometers 800 and magnetometers 802 positionable in sensor boards 600) may be sent to the control electronics 602 as shown in FIG. 6. The downhole parameters may be calculated and/or determined, as described herein, in the control electronics 602 and/or at an offsite location. The use of the virtual magnetometer may help to limit or reduce effects of noise in measuring downhole parameters of the downhole tool 102.

Figure 17:
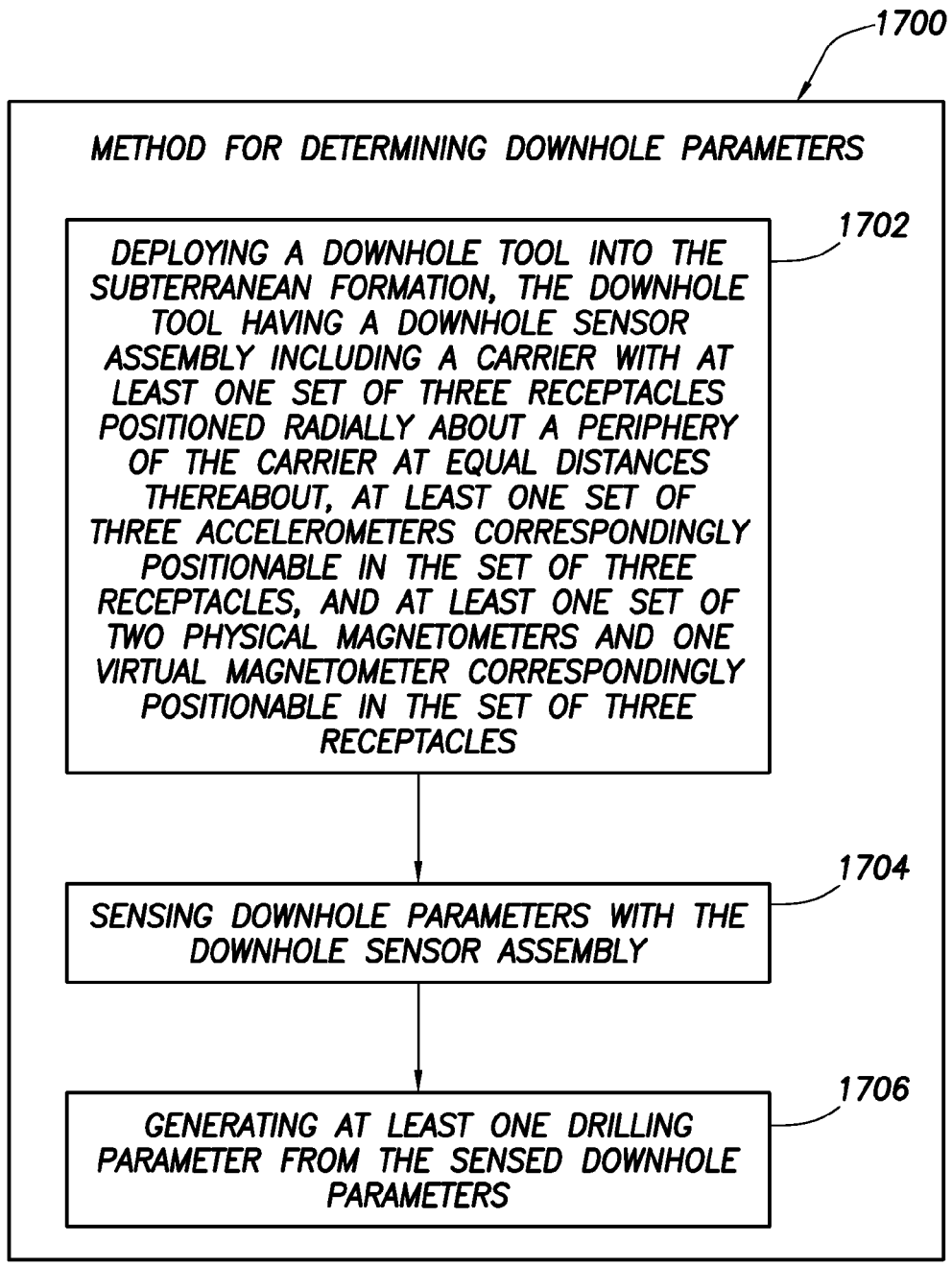
FIG. 17 is a flow chart depicting a method for determining downhole parameters.

FIG. 17 is a flow chart depicting a method (1700) for determining downhole parameters. The method involves deploying (1702) a downhole tool into the subterranean formation, the downhole tool having a downhole sensor assembly including a carrier with at least one set of three receptacles positioned radially about a periphery of the carrier at equal distances thereabout, at least one set of three accelerometers correspondingly positionable in the set of three receptacles, and at least one set of two physical magnetometers and one virtual magnetometer correspondingly positionable in the set of three receptacles. The method further involves sensing (1704) the downhole parameters with the downhole sensor assembly, and generating (1706) at least one drilling parameter from the sensed downhole parameters. The method may also involve determining a position of one of the three accelerometers, determining global coordinates of the three accelerometers, determining an angular acceleration of the downhole tool, determining bit whirl from the angular acceleration, measuring a magnetic field with the physical magnetometers and angular acceleration with the accelerometers, producing the virtual magnetometer from the measured magnetic field and/or the angular acceleration, and/or determining revolutions per minute from the two physical magnetometers and the virtual magnetometer. Sensing may be accomplished using a sensor in the downhole tool. The steps of the method may be performed in any order, and repeated as desired.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the disclosure may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more downhole tools with various combinations of magnetometers and accelerometers may be used.

Plural instances may be provided for components, operations, or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A sensor assembly for determining downhole parameters, the sensor assembly positionable in a downhole tool deployable into a subterranean formation to form a wellbore, the sensor assembly comprising:
   a carrier comprising at least one set of three receptacles, the at least one set of three receptacles positioned radially about a periphery of the carrier at equal distances thereabout;
   at least one set of accelerometers, each of the at least one set of accelerometers comprising three accelerometers correspondingly positionable in the at least one set of three receptacles; and
   at least one set of magnetometers, each of the at least one set of magnetometers comprising two physical magnetometers and one virtual magnetometer correspondingly positionable in the at least one set of three receptacles.

2. The sensor assembly of claim 1, further comprising at least one set of three sensor boards correspondingly positionable in the at least one set of three receptacles for supporting the at least one set of accelerometers and the at least one set of magnetometers therein.

3. The sensor assembly of claim 1, wherein the at least one set of three receptacles comprises a first set of three receptacles having the at least one set of accelerometers therein and a second set of three receptacles having the at least one set of magnetometers therein.

4. The sensor assembly of claim 1, further comprising a deployment device for housing the carrier.

5. The sensor assembly of claim 4, wherein the deployment device comprises an end cap for internal access thereof.

6. The sensor assembly of claim 4, wherein the deployment device is positionable within a drill collar of the downhole tool.

7. The sensor assembly of claim 4, wherein the deployment device is positionable about a drill bit of the downhole tool.

8. The sensor assembly of claim 4, wherein the deployment device comprises at least one centralizer on a periphery thereof for supporting the deployment device in the downhole tool.

9. The sensor assembly of claim 1, further comprising a power source.

10. The sensor assembly of claim 9, further comprising a connector for operatively connecting the power source to the carrier.

11. The sensor assembly of claim 1, wherein the at least one set of three receptacles comprises a first set of three receptacles with each of the three receptacles at 120 degree angles about the carrier.

12. The sensor assembly of claim 11, wherein the at least one set of three receptacles comprises a second set of three receptacles with each of the three receptacles at 120 degree angles about the carrier, the second set of three receptacles offset from the first set of three receptacles by 60 degrees.

13. The sensor assembly of claim 1, wherein the downhole parameters comprise one of lateral vibration, axial vibration, torsional vibration, rotations per minute (RPM), whirl, bit whirl, stick slip, local acceleration, global acceleration, displacement, strain, and combinations thereof.

14. The sensor assembly of claim 1, further comprising control electronics.

15. A system for determining downhole parameters of a wellbore penetrating a subterranean formation, comprising:
a downhole tool deployable into the subterranean formation to form the wellbore, the downhole tool having a bit at an end thereof;
a sensor assembly positionable in the downhole tool, the sensor assembly comprising:
a carrier comprising at least one set of three receptacles, the at least one set of three receptacles positioned radially about a periphery of the carrier at equal distances thereabout;
at least one set of accelerometers, each of the at least one set of accelerometers comprising three accelerometers correspondingly positionable in the at least one set of three receptacles; and
at least one set of magnetometers, each of the at least one set of magnetometers comprising two physical magnetometers and one virtual magnetometer correspondingly positionable in the at least one set of three receptacles.

16. The system of claim 15, further comprising a surface unit operatively linked to the downhole tool for communication therewith.

17. The system of claim 15, further comprising sensors in the downhole tool.

18. The system of claim 17, wherein the sensors are one of a gyroscopic sensor, a pressure sensor, a temperature sensor, a strain gauge sensor, a logging tool, a measurement while drilling tool, and combinations thereof.

19. A method for determining downhole parameters, the method comprising:
deploying a downhole tool into the subterranean formation, the downhole tool having a downhole sensor assembly, the sensor assembly comprising:
a carrier comprising at least one set of three receptacles, the at least one set of three receptacles positioned radially about a periphery of the carrier at equal distances thereabout;
at least one set of accelerometers, each of the at least one set of accelerometers comprising three accelerometers correspondingly positionable in the at least one set of three receptacles; and
at least one set of magnetometers, each of the at least one set of magnetometers comprising two physical magnetometers and one virtual magnetometer correspondingly positionable in the at least one set of three receptacles;
sensing downhole parameters with the downhole sensor assembly; and
generating at least one drilling parameter from the sensed downhole parameters.

20. The method of claim 19, wherein the step of sensing comprises determining a position of one of the three accelerometers.

21. The method of claim 20, wherein the step of sensing further comprises determining global coordinates of the three accelerometers.

22. The method of claim 21, wherein the step of sensing further comprises determining an angular acceleration of the downhole tool.

23. The method of claim 22, wherein the step of generating comprises determining bit whirl from the angular acceleration.

24. The method of claim 19, wherein the step of sensing downhole parameters comprises measuring a magnetic field with the physical magnetometers and angular acceleration with the accelerometers.

25. The method of claim 24, further comprising producing the virtual magnetometer from the measured magnetic field and the angular acceleration.

26. The method of claim 25, further comprising determining revolutions per minute from the two physical magnetometers and the virtual magnetometer.

27. The method of claim 19, wherein the step of sensing downhole parameters is further accomplished using a sensor in the downhole tool.

* * * * *